United States Patent
Soriente et al.

(10) Patent No.: US 11,451,369 B2
(45) Date of Patent: Sep. 20, 2022

(54) METHOD AND SYSTEM FOR MULTI-AUTHORITY CONTROLLED FUNCTIONAL ENCRYPTION

(71) Applicant: NEC Laboratories Europe GmbH, Heidelberg (DE)

(72) Inventors: Claudio Soriente, Madrid (ES); Miguel Ambrona, Pozuelo de Alarcon Madrid (ES); Dario Fiore, Pozuelo de Alarcon Madrid (ES)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 16/581,903

(22) Filed: Sep. 25, 2019

(65) Prior Publication Data
US 2020/0336292 A1 Oct. 22, 2020

Related U.S. Application Data

(60) Provisional application No. 62/834,458, filed on Apr. 16, 2019.

(51) Int. Cl.
*H04L 9/00* (2022.01)
*H04L 9/08* (2006.01)
*H04L 9/30* (2006.01)

(52) U.S. Cl.
CPC .......... *H04L 9/008* (2013.01); *H04L 9/0819* (2013.01); *H04L 9/30* (2013.01)

(58) Field of Classification Search
CPC ......... H04L 9/008; H04L 9/0819; H04L 9/30; H04L 9/085; H04L 9/088; H04L 2209/46
See application file for complete search history.

(56) References Cited

U.S. PATENT DOCUMENTS

| | | | | |
|---|---|---|---|---|
| 9,049,023 B2* | 6/2015 | Green | .................. | H04L 9/3073 |
| 10,404,450 B2* | 9/2019 | Wood | .................. | H04L 63/062 |
| 10,699,021 B2* | 6/2020 | De Oliveira | .......... | G06F 21/78 |
| 2013/0114810 A1* | 5/2013 | Kobayashi | .......... | H04L 9/3073 |
| | | | | 380/47 |
| 2020/0021568 A1* | 1/2020 | Becher | ............... | H04L 63/0478 |
| 2020/0252208 A1* | 8/2020 | Yoshida | ............... | H04L 9/0847 |
| 2021/0014040 A1* | 1/2021 | Kawai | .................. | H04L 9/0618 |

FOREIGN PATENT DOCUMENTS

KR 20200091112 A * 7/2020

OTHER PUBLICATIONS

Naveed, Muhammad et al. "Controlled Functional Encryption," Nov. 2014, ACM CCS.
Catalano, Dario et al. "Boosting Linearly-Homomorphic Encryption to Evaluate Degree-2 Functions on Encrypted Data," Oct. 2015.

* cited by examiner

*Primary Examiner* — Carl G Colin
*Assistant Examiner* — Han Yang
(74) *Attorney, Agent, or Firm* — Leydig, Voit & Mayer, Ltd.

(57) ABSTRACT

In a system having a plurality of servers, a method is executed to perform an encryption scheme. The method includes a server of the plurality of servers receiving a request token to compute a function on a data point, the data point being encrypted as a ciphertext and the request token being based on the ciphertext and the function. The server grants the request to compute the function on the datapoint by sending a function evaluation key, and participates in a distributed decryption protocol for determining a result of computing the function on the data point by sending a master secret key.

13 Claims, 3 Drawing Sheets

METHOD AND SYSTEM FOR MULTI-AUTHORITY CONTROLLED FUNCTIONAL ENCRYPTION

CROSS REFERENCE TO PRIOR APPLICATION

Priority is claimed to U.S. Provisional Patent Application No. 62/834,458, filed on Apr. 16, 2019, the entire disclosure of which is hereby incorporated by reference herein.

FIELD

The present invention relates to a method and system for multi-authority controlled functional encryption.

BACKGROUND

Controlled Functional Encryption (CFE) is an encryption scheme that allows a user (or client) to learn only certain functions of encrypted data by using keys obtained from an authority. The motivation behind CFE is to enhance privacy and usability requirements in various scenarios where prior cryptographic tools (e.g., secure multi-party computation and traditional functional encryption) are not adequate.

CFE allows for computation on encrypted data, and accounts for three entities: (1) a data producer that encrypts a data point and sends it to a client; (2) a client that can compute functions on the data encrypted by a data producer; and (3) a server that acts as an authority, and allows or denies the client to compute a specific function over a specific ciphertext (encrypted text).

In CFE, a client computes a function on a ciphertext via an interactive protocol between the client and the server. Here, the server decides whether the client is entitled to compute the specific function on the specific ciphertext. In other words, the server enforces access control over ciphertexts. The data producer who outputs the cipher text can, for example, define the access control policy. In this case, the data producer trusts the server to enforce the policy.

CFE also includes security provisions to ensure confidentiality of the data encrypted by a data producer (that is, unless a client and the server collude). Further, given a function $f$ and a ciphertext c, encrypting data point x, CFE ensures that a client learns $f(x)$, and nothing else, if and only if the server allows the client to carry out the computation.

State of the art CFE, however, only considers scenarios with a single server and single-valued functions (i.e., the function input is produced by one client). See. e.g., Naveed et al., "Controlled Functional Encryption," Proceedings of the 2014 ACM SIGSAC Conference on Computer and Communications Security, pp. 1280-1291 (2014) ("Naveed") (the entire contents of which are hereby incorporated by reference herein). Further, the state of the art CFE only provides ad-hoc constructions for linear functions, and resorts to generic multi-party computation (e.g., based on garbled circuits) to compute non-linear functions.

The state of the art CFE also does not cater to scenarios where a client wishes to compute a function over multiple ciphertexts, potentially produced by different data producers. For example, given the encryption of a DNA string, say c, the state of the art could be used to compute a hamming distance between c and a reference DNA string (i.e., in cleartext). Yet, the state of the art CFE does not allow for computing a hamming distance between c and another encrypted DNA string c'.

Similarly, state of the art CFE does not allow for multiple servers. The inventors have recognized, however, that the availability of two or more servers provides stronger privacy guarantees to data producers (because, for example, all servers must agree for a client to compute a function over a specific ciphertext). This is especially relevant in scenarios where malicious clients and servers collude. In the single-server scenario, as soon as both a client and the server are malicious, confidentiality for data output by data producers is lost. In case of multiple servers, a single honest server is sufficient to keep data confidentiality.

Further, the state of the art CFE uses an ad-hoc protocol for linear functions and resorts to expensive, garbled circuits to compute non-linear functions.

SUMMARY

An embodiment of the present invention provides a method for performing an encryption scheme in a system having a plurality of servers. The method includes a server of the plurality of servers receiving a request token to compute a function on a data point, the data point being encrypted as a ciphertext and the request token being based on the ciphertext and the function. The server also grants the request to compute the function on the datapoint by sending a function evaluation key, and participates in a distributed decryption protocol for determining a result of computing the function on the data point by sending a master secret key.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
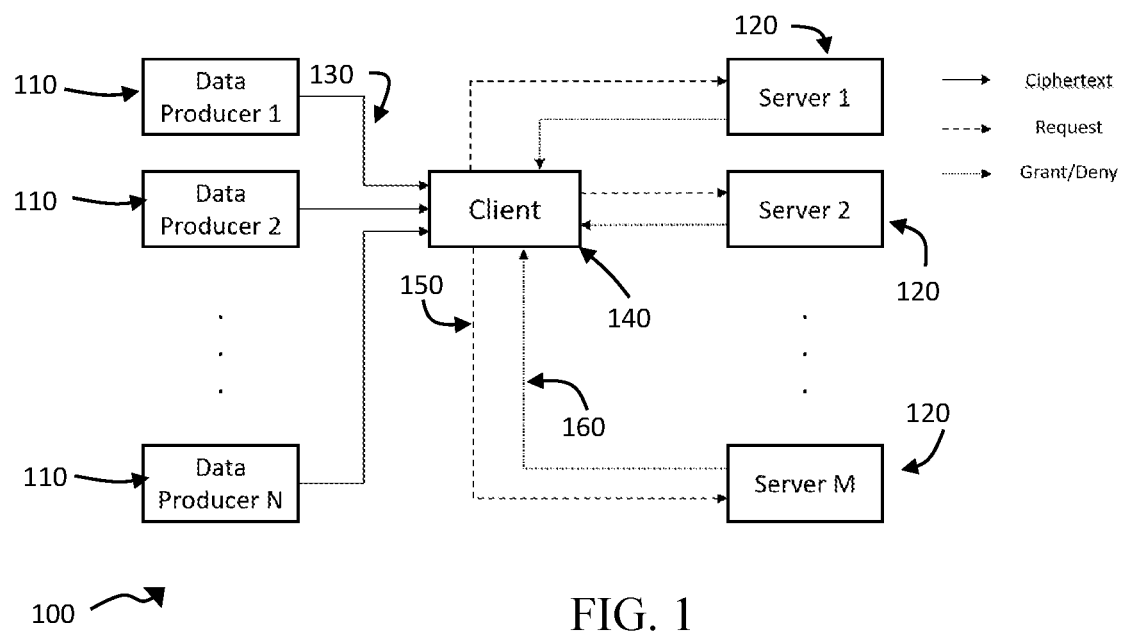
FIG. 1 illustrates a multi-authority controlled functional encryption system according the present invention.

According to the present invention, systems and methods of Multi-Authority Controlled Functional Encryption (MCFE) are provided. As illustrated and described herein, multi-authority CFE of the present invention overcomes many drawbacks and limitations of the state of the art CFE.

Embodiments of the present invention provide an encryption scheme that allows a client to evaluate non-linear (e.g., quadratic) functions over messages encrypted by third-party data producers, where evaluation is subject to approval from and collaboration of n third-party servers.

According to an embodiment of the present invention, there is provided a method including the followings operations: (1) encrypting, by a data-producer, a data point to generate a ciphertext; (2) transmitting, by the data-producer to a client, the resulting ciphertext; (3) issuing, by the client to at least one server, a request to compute a function on the data point encrypted as the ciphertext; (4) granting, by the server to the client, its request to compute the function over data point encrypted as the ciphertext; and (5) decrypting, by the client and the at least one server, the ciphertext, where the output is the computation of the function evaluated at the data point encrypted as the ciphertext, the output only being available to the client. The function can be a non-linear function, such as a quadratic function. The encryption step can include using both a linearly-homomorphic encryption scheme and an adaptive chosen ciphertext attack encryption scheme.

Embodiments of the present invention provide at least the following improvements over the state of the art CFE. First, embodiments of the present invention allow for computing a function over multiple ciphertexts (e.g., produced by several data producers), whereas the state of the art only considers functions over a single ciphertext. Second, embodiments of the present invention allow for computing quadratic functions (e.g., variance, hamming distance, etc.) over encrypted data (e.g., ciphertexts output by data producers) by using an ad-hoc cryptographic protocol, whereas the state of the art resorts to generic multi-party computation to compute non-linear functions. Third, embodiments of the present invention cater for multiple authorities, whereas the state of the art only allows for a single authority. For example, Embodiments of the present invention allow for application scenarios where multiple servers co-exist, which is not accounted for in the state of the art. When a data producer outputs a ciphertext c, the data producer can decide the set of servers S that should enforce access control on c. As a result, no client can compute any function over c, unless all servers in S agree.

An encryption scheme H can be defined by a triplet of algorithm (KeyGen, Enc, Dec), where:
1. The algorithm KeyGen($1^k$) ("key generation") takes as its input the security parameter k, and outputs a public key pk and a secret key sk (also called a private key);
2. The algorithm Enc(pk,x) ("encrypt") takes as its input the public key pk and a message x, and outputs a ciphertext c; and
3. The algorithm Dec(sk, c) ("decrypt") takes as its input the secret key sk and the ciphertext c, and outputs a message m.

Such a scheme is correct if, for any message m of the message-space, we have Pr(m←H.Dec(sk,Enc(pk,m)),(pk, sk)←H.KeyGen($1^k$))=1−negl(k), where negl(k) is function that is negligible in k (meaning that the function approaches zero faster than 1 over any polynomial in the security parameter k; the security parameter k is used to determine the size of relevant elements of the encryption scheme, e.g., private keys).

Such a scheme is semantically secure if an adversary holding only the public key has a negligible advantage over guessing in the following game. The challenger runs (sk, pk)←KeyGen($1^k$) and gives the public key pk to the adversary. The adversary picks two messages $m_0, m_1$ and gives them to the challenger. The challenger picks a random bit b and returns to the adversary c*←Enc(pk,$m_b$). The adversary must guess which out of messages $m_0, m_1$ was encrypted by the challenger. Similarly, such a scheme is CCA2 (Adaptive Chosen Ciphertext Attack) secure if the adversary has the same advantage over guessing in the same game with the addition of a decryption oracle. The adversary can ask the decryption oracle to decrypt any ciphertext but c*.

Some encryption schemes are so-called "linearly-homomorphic." Here, the scheme defines two operations: "⊕" and "⊗", such that given two ciphertexts, Enc(pk,m), Enc(pk, m'), then Enc(pk,m)⊕Enc(pk,m')=Enc(pk,m+m'). Further, given a ciphertext Enc(pk,m) and a constant t, then t⊗Enc(pk,m)=Enc(pk,tm). Linearly-homomorphic encryption schemes allow for computing linear functions over encrypted data.

Further, some encryption schemes allow for distributed decryption. Here the secret key output by (sk,pk)←KeyGen($1^k$) is split in n random shares, say $sk_1, \ldots, sk_n$ and given a ciphertext c←Enc(pk,m), we have $\Sigma_{i \in [n]}$Dec($sk_i$,c)=m.

Catalano and Fiore, "Using Linearly-Homomorphic Encryption to Evaluate Degree-2 Functions on Encrypted Data," Proceedings of the 22nd ACM SIGSAC Conference on Computer and Communications Security, pp. 1518-1529 (2015) ("Catalano and Fiore") (the entire contents of which is hereby incorporated by reference herein), discusses how to leverage a linearly-homomorphic encryption scheme H to evaluate degree-d functions over encrypted data. In particular, Catalano and Fiore defines an encryption scheme H'= (KeyGen, Enc, Eval, Dec) where:
1. The algorithm H'.KeyGen($1^k$) ("key generation") takes as its input the security parameter k, runs (pk,sk)←H.KeyGen($1^k$), and sets the public pk and secret keys sk accordingly, here H. Key Gen( ) is the Key Gen( ) algorithm of the linearly-homomorphic encryption scheme;
2. The algorithm H'.Enc(pk, x) ("encrypt") takes as its input the public key pk and a message x, outputs a ciphertext as a pair (a,b), where a=x−r and b=H.Enc(pk,r) for a random r, and H.Enc( ) is the algorithm Enc.( ) of the linearly-homomorphic encryption scheme;
3. The algorithm H'.Eval(f,(a,b)) ("evaluate") takes as its input a degree-d function $f$ and a ciphertext (a,b), it uses the homomorphic properties of H to output a "second-level" ciphertext c, such that if a=x−r and b=H.Enc(pk,r)), then c=H.Enc(pk, $f(x)-f(r)$), where r is random, and H.Enc( ) is the Enc( ) algorithm of the linearly-homomorphic encryption scheme (see e.g., Catalano and Fiore explaining the homomorphic properties and a second-level ciphertext);
4. The algorithm H'.Dec(sk,c) ("decrypt") takes as its input the secret key sk and a ciphertext c, if c is a second-level ciphertext (i.e., a ciphertext output by Eval( )), it outputs m=H.Dec(sk,c); otherwise if c=(a,b) is a "first-level ciphertext", it outputs a+H.Dec(sk,b), where H.Dec( ) is the Dec( ) algorithm of the linearly-homomorphic encryption scheme.

The technique described in Naveed allows for computing arbitrary degree-d functions if d=2 and a limited set of functions if d>2. As the terms are used above, a level-one ciphertext has two elements, where one is in the message space and one is in the ciphertext space of a linearly homomorphic encryption scheme, and a level-two ciphertext has more than two elements.

An embodiment of the present invention provides a method for performing an encryption scheme in a system having a plurality of servers. The method includes a server of the plurality of servers receiving a request token to compute a function on a data point, the data point being encrypted as a ciphertext and the request token being based on the ciphertext and the function. The server also grants the request to compute the function on the datapoint by sending a function evaluation key, and participates in a distributed decryption protocol for determining a result of computing the function on the data point by sending a master secret key.

In an embodiment, the function is a non-linear function.

The ciphertext can be an output of an encryption algorithm using both a linearly-homomorphic encryption scheme and an adaptive chosen ciphertext attack encryption scheme. In an embodiment, the ciphertext is of the form: $(x-r_0, H.Enc(pk^H, r_0), \{E.Enc(pk^E_i, ctr_i)\}_{i \in [n]})$. Here, H.Enc( ) is an encryption algorithm of the linearly-homomorphic encryption scheme, E.Enc( ) is an encryption algorithm of the adaptive chosen ciphertext attack encryption scheme, $ctr_i = r_{i-1} - r_i, H.Enc(pk^H, r_i)$, $r_i$ ($i \in [0, n-1]$) is random, $r_n = 0$, x is the data point, n is the number of servers in the system, $pk^H$ is a public k under the linearly-homomorphic encryption scheme, $\{pk^E_i\}_{i \in [n]}$ are public keys of the servers under the adaptive chosen ciphertext attack encryption scheme.

The function evaluation key can be generated based upon the request token, the function, and the server's master secret key. In an embodiment, the function evaluation key is generated by decrypting the request token.

An authority can generate the master secret key. In an embodiment, the master secret key is based on the server's share of a secret key under a linearly-homomorphic encryption scheme and another secret key under an adaptive chosen ciphertext attack encryption scheme.

In an embodiment, the ciphertext includes a plurality of ciphertexts of a plurality of data points, including the data point.

In an embodiment, the server does not learn the computed function on the data point.

Another embodiment of the present invention provides, a method for performing an encryption scheme in a system having a plurality of servers, at least one data provider and a client. In the method, the client receives from the at least one data provider, a ciphertext which is an encrypted data point. The client may send to each of the servers a respective request token to compute a function on the data point, the respective request token being based on the ciphertext and the function. Each of the servers receive a respective function evaluation key, and participate in a distributed decryption protocol for determining a result of computing the function on the data point by providing a private input.

The private input may include the respective function evaluation key received from each of the servers and a decryption token, the decryption token being based on an encryption algorithm of a linearly-homomorphic encryption scheme.

The method may further include generating the respective request token for each of the servers according to: $ctx^{req} = E.Enc(pk^E_i, (r_{i-1} - r_i, H.Enc(pk^H, r_i)))$. Here, $ctx^{req}$ is the respective request token for an i-th server, E.Enc( ) is an encryption algorithm of an adaptive chosen ciphertext attack encryption scheme, H.Enc( ) is an encryption algorithm of a linearly-homomorphic encryption scheme, $pk^E_i$ is a public key under the adaptive chosen ciphertext attack encryption scheme for the i-th server, $pk^H$ is a public key under the linearly-homomorphic encryption scheme, $r_i$ ($i \in [0, n-1]$) is random, $r_n = 0$, and n is the number of servers. The function may be a non-linear function.

According to another embodiment of the present invention, a server is provided that includes a processor coupled to a non-transitory storage medium containing instructions, which when executed by the processor, cause the server to: receive a request token to compute a function on a data point, the data point being encrypted as a ciphertext and the request token being based on the ciphertext and the function, granting the request to compute the function on the datapoint by sending a function evaluation key, and participate in a distributed decryption protocol for determining a result of computing the function on the data point by sending a master secret key.

With the above in mind, the multi-authority Controlled Functional Encryption (MCFE) scheme according to embodiments of the present invention is described in detail below in connection with the figures.

FIG. 1 illustrates a schematic model of a MCFE system 100 of the present invention. The MFCE system 100 of FIG. 1 has multiple data producers 110 and multiple servers 120. The multiple data producers 110 send encrypted data (solid arrows) 130 to a client 140. The client's goal is to compute a function $f$ over the data encrypted under the ciphertexts provided by the data producers 110. In order to do so, the client 140 sends a request (dashed arrows) 150 to each of the servers 120. Each server 120 decides whether to grant or deny the request from the client 140 (sending the grant/replay response 160). Finally, the client 140 computes $f$ over the data encrypted under the ciphertexts provided by the data producers 110, if all servers 120 grant the request.

According to an embodiment, the above system can be instantiated for quadratic functions of the form $f(x) = ax^2 + bx$, for a, x, b elements in $Z_p$, where p is a prime ($Z_p$ thus is the set o integers coprime with p). Here, H=(Setup, Enc, Dec) is a linearly-homomorphic encryption scheme with distributed decryption, and E=(Setup, Enc, Dec) is a CCA2 (Adaptive Chose Ciphertext Attack) encryption scheme. The Eval( ) algorithm of Naveed as described above can also be employed in embodiments.

According to an embedment, algorithms and protocols that instantiate the system of FIG. 1 include:

1. The algorithm Setup($1^k$) ("key setup"), which takes as its input the security parameter k, and outputs a master public key mpk and n master secret keys $\{msk_i\}_{i \in [n]}$ (in an embodiment n is the number of servers);
2. The algorithm Enc(mpk,x) ("encrypt"), which takes as its input the master public key mpk and a value x, and outputs ciphertext ctx;
3. The algorithm KeyReq(ctx,$f$) ("key request"), which takes as its input the ciphertext ctx and a function $f \in F$, and outputs n request tokens $\{ctx^{reg}_i\}_{i \in [n]}$ and a decryption token $ctx^{dec}$;
4. The algorithm KeyExtract($ctx^{reg}_i, f, msk_i$) ("key extract"), which takes as its input a request token $ctx^{req}_i$, function $f$, and the i-th master secret key $msk_i$, and outputs the i-th function evaluation key $skf_i$; and
5. The protocol Dec($ctx^{dec}, \{skf_i\}_{i \in [n]}; msk_1; \ldots ; msk_n$) ("decrypt"), which is an interactive protocol between a client, with private input ($ctx^{dec}, \{skf_i\}_{i \in [n]}$), and each of the servers, with its respective private input $msk_i$. The private output for the client is $y = f(x)$, whereas each server outputs nothing.

In an embodiment of the present invention, Setup( ) defines a CCA2 (Adaptive Chose Ciphertext Attack) secure encryption scheme E=(KeyGen, Enc, Dec), where the i-th server (i∈[n]) has its own public-private key pair ($pkE_i$, $skE_i$), and a linearly-homomorphic encryption scheme H=(Keygen, Enc, Dec), where the i-th server (i∈[n]) has a share of the decryption key $skH_i$ and the public key is pkH.

Setup( ) can be either run by an authority that distributes keys to the server and then goes offline, or it can alternatively be run in a distributed fashion by all the servers. In the latter case, no authority is needed. In order to adhere to the above definition of MCFE, mpk=pkH, $\{pkE_i\}$ i∈[n] and, for i∈[n], $msk_i = (skH_i, skE_i)$.

Figure 2:
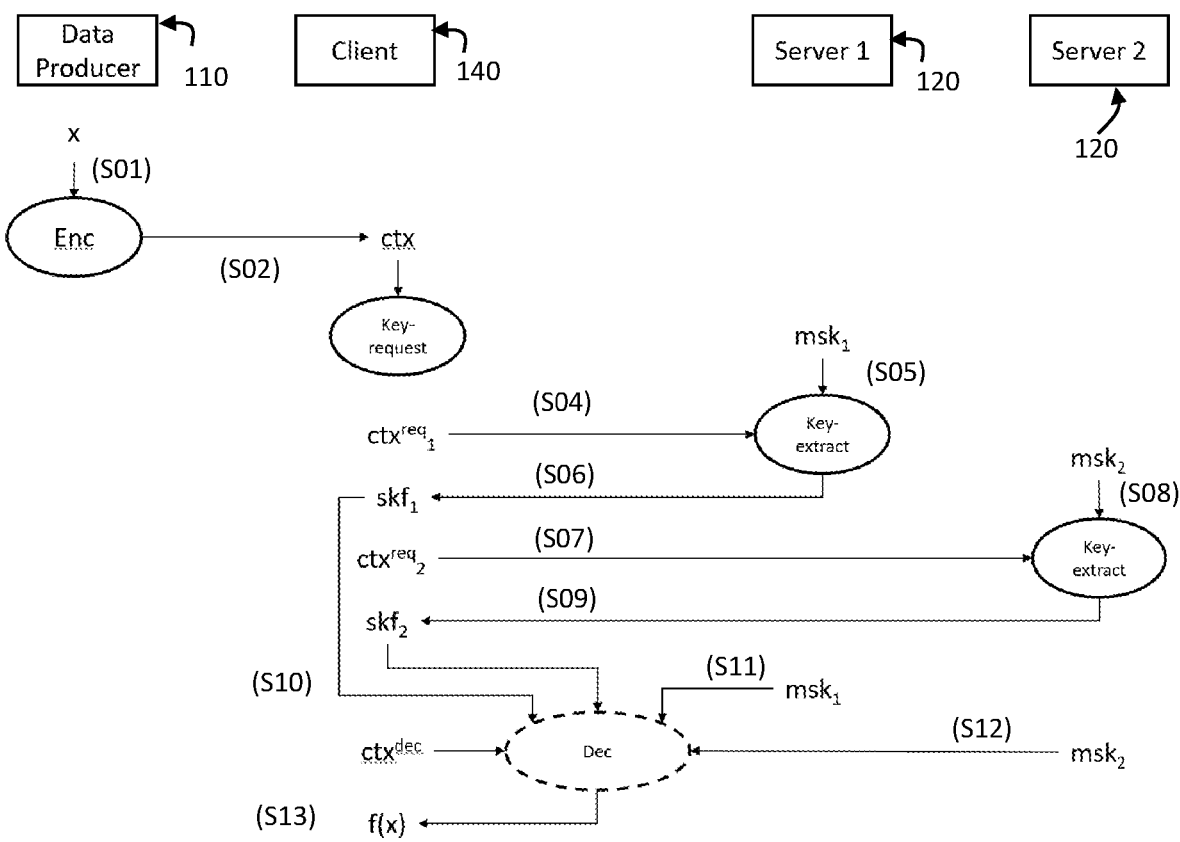
FIG. 2 illustrates the operation of the multi-authority controlled functional encryption system according to the present invention.

FIG. 2 illustrates an overview of the MCFE system 100 after Setup( ) has been run and all secret server keys are in place. The embodiment shown in FIG. 2 accounts for one data producer 110 and two servers 120, but the present invention can accommodate any number of data producers 110 and servers 120.

The data producer 110 encrypts a data item x (S01) to produce a ciphertext ctx, and sends the ciphertext ctx to the client 140 (S02). In particular, the encryption routine on input x, outputs a ciphertext of the form:

$$ctx=(x-r_0, H.Enc(pk^H, r_0), \{E.Enc(pk^E_i, ctr_i)\}_{i \in [n]})$$

where $ctr_i=r_{i-1}-r_i$, $H.Enc(pk^H, r_i)$, $r_i(i \in [0,n-1])$ is random, and $r_n=0$. The first two elements of a ciphertext ($a=x-r_0$, $b=H.Enc(pk^H, r_0)$) are similar to a ciphertext as defined in Catalano and Fiore. Therefore, embodiments can use the Eval( ) algorithm of Catalano and Fiore to compute c'←Eval(a,b), where c' is equivalent to $H.Enc(pk^H, f(x)-f(r))$.

Nevertheless, in Catalano and Fiore the secret key corresponding to the public key $pk^H$ is held by one party, whereas embodiments of the present invention distribute the secret key across then servers 120. Further, embodiments of the present invention randomly share $r_0$ across all servers 120 (via $ctr_i$), and use encryption scheme E to transfer securely each of those shares to each of the servers 120.

Given ciphertext ctx and a function $f$, the client 140 may be interested in computing $f(x)$. To do so, the client 140 should interact with all of the servers 120. The client 140 runs $(\{ctx^{reg}_i\}_{i \in [n]}, ctx^{dec}) \leftarrow KeyReq(ctx, f)$ ("key request") to obtain n request tokens $\{ctx^{req}_i\}_{i \in [n]}$, one for each server 120, and one decryption token $ctx^{dec}$ (S03). In particular, the request token for the i-th authority is:

$$ctx^{req}_i = E.Enc(pk^E_i, (r_{i-1}-r_i, H.Enc(pk^H, r_i)))$$

whereas the decryption token that the client 140 keeps is:

$$ctx^{dec} = H.Enc(pk^H, f(x)-f(r_0)),$$

which the client 140 computes by applying the Eval( ) algorithm of Naveed to $x-r_0$, $H.Enc(pk^H, r_0)$.

The client 140 issues to the i-th server 120 a request to compute the function $f(x)$, by sending the request token $ctx^{req}_i$ to the i-th server 120 (S04). If the i-th server 120 decides to honor the client's request, it runs $skf_i \leftarrow KeyExtract(ctx^{req}_i, f, msk_i)$ ("key extract") (S05), and sends the function evaluation key $skf_i$ to the client (S06). In particular, the i-th server decrypts the request token $ctx^{req}_i$ as:

$$a, b = E.Dec(sk^E_i, ctx^{req}_i)$$

where $a=r_{i-1}-r_i$, and $b=H.Enc(pk^H, r_i)$, and then uses the Eval( ) algorithm of Naveed on input a, b to compute:

$$skf_i = H.Enc(pk^H, f(r_{i-1})-f(r_i)).$$

The client 140 can issue another request to the next (i+1) server 120 in the system to compute the function $f(x)$, by sending the corresponding request token $ctx^{req}_{i+1}$ to the next server 120 (S07). If that server 120 decides to honor the client's request, it runs $skf_2 \leftarrow KeyExtract(ctx^{req}_{i+1}, f, msk_{i+1})$ ("key extract") (S08), and sends its secure key $skf_2$ to the client (S09).

Finally, if all n servers 120 have honored the client's requests, then the client 140 and the n servers 120 engage in a distributed decryption protocol where the client's private input is $(ctx^{dec}, \{skf_i\}_{i \in [n]})$ (S10), the private input of the i-th server 120 is its master secret key $msk_i$ (S11), and the private input of the next server 120 is its master secret key $msk_{i+1}$ (S12). At the end of the protocol, the client's private output is $y=f(x)$ (i.e., the result of executing the function $f( )$ on the data input x) (S13), whereas servers 120 output nothing. In particular, the client computes:

$$h = ctx^{dec} \oplus skf_1 \oplus \ldots \oplus skf_n$$

which is equivalent to $H.Enc(pk^H, f(x)-f(0))$, and then asks each authority to partially decrypt h. That is, the client 140 sends h to the i-th server 120 that uses the share of its secret key of the linearly-homomorphic encryption scheme to compute $y_i \leftarrow H.Dec(sk_i, h)$, and sends it back to the client 140. Finally, the client 140 outputs $y = \Sigma_{i \in [n]} y_i$. The latter is equivalent to $f(x)-f(0)$.

Correctness of the scheme implies that if all algorithms are executed correctly, then the client 140 learns $y=f(x)$ (i.e., the result of the function executing on the data point). Security of the scheme implies that: (1) no information on the data point x is leaked unless the client 140 and all of the servers 120 collude, (2) the client 140 learns $f(x)$ and nothing else, if and only if all of the n servers 120 decided to honor the client's request, and (3) no server 120 learns any information on x nor do the servers learn any information on $f(x)$.

According to embodiments, pseudocode of the algorithms discussed above can be represented as:

1. For the algorithm Setup($1^k$): On the input of the security parameter k,
   a. Run $(pk^H, sk^H) \leftarrow H.KeyGen(1^k)$ and compute n random shares of $sk^H$, namely $\{sk^H_i\}_{i \in [n]}$, such that $sk^H = \Sigma_{i \in [n]} sk^H_i$
   b. For $i \in [n]$, run $(pk^E_i, sk^E_i) \leftarrow E.KeyGen(1^k)$
   c. Set $mpk=pk^H$, $\{pk^E_i\}_{i \in [n]}$
   d. For $i \in [n]$, set $msk_i = sk^H_i, sk^E_i$ 2. For the algorithm Enc(mpk, x): On the input of the master public key mpk and a value x that belongs to $Z_p$,
   a. Parse mpk as $pk^H$, $\{pk^E_i\}_{i \in [n]}$
   b. For I=[0, n−1], sample $r_i$ at random from $Z_p$
   c. Set, $r_n = 0$
   d. For $i \in [n]$, set $ctr_i = (r_{i-1}-r_i, H.Enc(pk^H, r_i))$
   e. Output $ctx=(x-r_0, H.Enc(pk^H, r_0), \{E.Enc(pk^E_i, ctr_i)\}_{i \in [n]})$ 3. For the algorithm KeyReq(ctx, $f$): On the input of a ciphertext ctx and a function $f \in F$,
   a. Parse ctx as $(a, b, \{e_i\}_{i \in [n]})$
   b. For $i \in [n]$, set $ctx^{req}_i = e_i$
   c. Run $ctx^{dec} \leftarrow Eval(f, (a,b))$; the latter is equivalent to $H.Enc(pk^H, f(x)-f(r_0))$, given that $a=x-r_0$ and $b=H.Enc(pk^H, r_0)$
   d. Output $\{ctx^{reg}_i\}_{i \in [n]}, ctx^{dec}$ 4. For the algorithm KeyExtract($ctx^{req}_i$, $f$, $msk_i$): On the input of a request token $ctx^{req}_i$, a function $f$, and the master secret key of the i-th server $msk_i$,
   a. Parse $msk_i = sk^H_i, sk^E_i$
   b. Compute $ctr_i = E.Dec(sk^E_i, ctx^{req}_i)$
   c. Parse $ctr_i$ as $(a_i, b_i)$ and run $skf_i \leftarrow Eval(f, (a_i, b_i))$; the latter is equivalent to $H.Enc(pk^H, f(r_{i-1})-f(r_i))$, given that $a_i=r_{i-1}-r_i$ and $b_i=H.Enc(pk^H, r_i)$ 5. For the algorithm Dec($ctx^{dec}$, $\{skf_i\}i \in_{[n]}$; $msk_1$; ... ; $msk_n$): On the input of the client's private input ($ctx^{dec}$, $\{skf_i\}_{i \in [n]}$) and on the i-th server's private input $msk_i$,
   a. Client computes $h = ctx^{dec} \oplus skf_1 \oplus \ldots \oplus skf_n$; the latter is equivalent to $H.Enc(pk^H, f(x)-f(0))$, since $ctx^{dec} = H.Enc(pk^H, f(x)-f(r_0))$, for $i \in [n]$ $skf_i = H.Enc(pk^H, f(r_{i-1})-f(r_i))$, and $f(r_n)=f(0)$
   b. For $i \in [n]$, client sends to the i-th server h;
   c. For $i \in [n]$, the i-th server uses $msk_i = sk^H_i, sk^E_i$ to compute $y_i = H.Dec(sk^H_i, h)$ and sends $y_i$ to the client
   d. The client outputs $y = \Sigma_{i \in [n]} y_i + f(0)$ The above scheme can be extended to accommodate multivariate functions where inputs are provided by different data producers. In particular, the scheme can be extended to compute functions of the form $f(x)=x^T A x + b^T x$, where A is an l-by-l symmetric matrix of elements in $Z_p$, and b,x vectors of l elements in $Z_p$, and p is a prime.

Algorithms Setup and Decrypt remain unchanged. The encryption algorithm does not change, but the notation is updated to reflect the fact that computation is performed over vectors of size 1. Here, $x_j$ denotes the j-th input to the function.

1. Enc(mpk,$x_j$): On the input of the master public key mpk and a value $x_j$ that belongs to $Z_p$,
   a. Parse mpk as $pk^H$, $\{pk^E_i\}_{i\in[n]}$
   b. For i=[0,n-1], sample $r_{i,j}$ at random from $Z_p$
   c. Set, $r_{n,j}=0$
   d. For i∈[n], set $ctr_{i,j}=(r_{i-1,j}-r_{i,j}, H.Enc(pk^H,r_{i,j}))$
   e. Output $ctx_j=(x_j-r_{0,j}, H.Enc(pk^H,r_{0,j}), \{E.Enc(pk^E_i,ct_{i,j})\}_{i\in[n]})$ In the scenario where $ctx_1, \ldots, ctx_l$ are the ciphertexts of the l inputs $x_1, \ldots, x_l$ to function $f$. For simplicity, the notation $ctx=[ctx_1, \ldots, ctx_l]$, $x=[x_1, \ldots, x_j]$ is used, and for i∈[0,n]$r_i=[r_{i,1}, \ldots, r_{i,l}]$. Also, if $ctx_j=a_j, b_j, \{e_{i,j}\}_{i\in[n]}$, we also define $\alpha=[a_1, \ldots, a_l]$ and $\beta=[b_1, \ldots, b_l]$, and, for i∈[n] $\varepsilon_i=[e_{i,1}, \ldots, e_{i,l}]$. Here, the key request and key extract algorithm can be expressed with the following pseudocode:

1. KeyReq(ctx,$f$): On the input of a ciphertext ctx and a function $f\in F$,
   a. Parse ctx as $(\alpha, \beta, \{\varepsilon_i\}_{i\in[n]})$
   b. For i∈[n], set $ctx^{req}_i=\varepsilon_i$
   c. Run $ctx^{dec}\leftarrow Eval(f(\alpha,\beta))$; the latter is equivalent to $H.Enc(pk^H,f(x)-f(r_0))$, given that $\alpha=x-r_0$ and $\beta=[H.Enc(pk^H,r_{0,1}) \ldots H.Enc(pk^H,r_{0,l})]$
   d. Output $\{ctx^{req}_i\}_{i\in[n]}, ctx^{dec}$ 2. KeyExtract($ctx^{req}_i, f, msk_i$): On the input of a request token $ctx^{req}_i$, a function $f$, and the master secret key of the i-th server $msk_i$,
   a. Parse as $ctx^{req}_i$ as $[ctx^{req}_{i,1}, \ldots, ctx^{req}_{i,l}]$ and $msk_i=sk^H_i, sk^E_i$
   b. For j∈[l], compute $(a_j,b_j)=E.Dec(sk^E_i,ctx^{req}_{i,j})$
   c. Set $\alpha=[a_1, \ldots a_l]$ and $\beta=[b_1, \ldots, b_l]$
   d. Run $skf_i \leftarrow Eval(f,(\alpha,\beta))$; the latter is equivalent to $H.Enc(pk^H,f(r_{i-1})-f(r_i))$, given that $\alpha=r_{i-1}-r_i$ and $\beta=[H.Enc(pk^H,r_{i-1}) \ldots H.Enc(pk^H,r_{i,1})]$
   e. Output $skf_i$ Compared to state of the art, embodiments of the present invention allow for computing multivariate functions and accommodate multiple servers. All servers should agree and cooperate with a client for the latter to compute a function over a ciphertext. Furthermore, embodiments of the present invention provide a faster solution to compute quadratic functions, whereas state of the resorts to generic multi-party computation.

Figure 3:
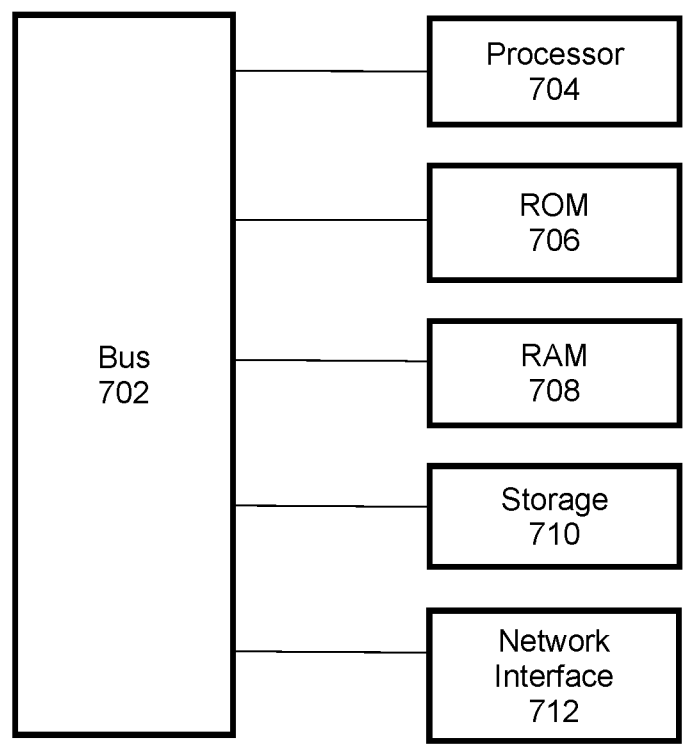
FIG. 3 is a block diagram of a processing system according to one embodiment.

FIG. 3 is a block diagram of a processing system according to one embodiment. The processing system is a specialty computer configured and programed to embody and perform the multi-authority controlled functional encryption systems and methods of the present invention, for example, the processing system may be employed to embody a server, client, and/or data provider described above. The processing system includes a processor 704, such as a central processing unit (CPU) that executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes processor executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill. In particular, the present invention covers further embodiments with any combination of features from different embodiments described above. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for performing an encryption scheme in a system having a plurality of servers, the method comprising:
   receiving, by a first server of the plurality of servers, a request from a client to compute a function on a data point, the data point being encrypted as a ciphertext and the request including a request token generated by the client based on the ciphertext and the function; and
   granting, by the first server, the request to compute the function on the data point by sending a function evaluation key to the client, wherein the function evaluation key is generated by the first server based on the request token and a master secret key associated with the first server, wherein the master secret key is based on a share of a secret key under a linearly-homomorphic encryption scheme and another secret key under an adaptive chosen ciphertext attack encryption scheme,
   wherein the function evaluation key is one of a plurality of function evaluation keys, each function evaluation key in the plurality of function evaluation keys corresponding to one of the plurality of servers participating in a distributed decryption protocol, and the plurality of function evaluation keys enable the client to generate a result of computing the function on the data point.

2. The method according to claim 1, wherein the function is a non-linear function.

3. The method according to claim 1, wherein the ciphertext is an output of an encryption algorithm using both the linearly-homomorphic encryption scheme and the adaptive chosen ciphertext attack encryption scheme.

4. The method according to claim 3, wherein the ciphertext is of the form:

$$(x-r_0, H.Enc(pk^H, r_0), \{E.Enc(pk^E_i, ctr_i)\}_{i\in[n]}),$$

wherein H.Enc( ) is an encryption algorithm of the linearly-homomorphic encryption scheme, E.Enc( ) is an encryption algorithm of the adaptive chosen ciphertext attack encryption scheme, $ctr_i=r_{i-1}-r_i, H.Enc(pk^H,r_i)$, $r_i(i\in[0,n-1])$ is random, $r_n=0$, x is the data point, n is the number of servers in the system, $pk^H$ is a public key under the linearly-homomorphic encryption scheme, $\{pk^E_i\}_{i\in[n]}$ are public keys of the plurality of servers under the adaptive chosen ciphertext attack encryption scheme.

5. The method according to claim 1, wherein the function evaluation key is generated based upon the request token, the function, and the master secret key associated with the first server.

6. The method according to claim 5, wherein the function evaluation key is generated by decrypting the request token.

7. The method according to claim 1, wherein an authority generates the master secret key associated with the first server.

8. The method according to claim 1, wherein the ciphertext comprises a plurality of ciphertexts of a plurality of data points, including the data point.

9. The method of claim 1, wherein the first server does not learn the computed function on the data point.

10. A method for performing an encryption scheme in a system having a plurality of servers, at least one data provider, and a client, the method comprising:
receiving, by the client from the at least one data provider, a ciphertext corresponding to an encrypted data point,
sending, by the client to each of the servers, a respective request to compute a function on the data point, each respective request including a respective request token corresponding to a particular server and generated based on the ciphertext and the function,
receiving, from each of the servers, a respective function evaluation key, and participating in a distributed decryption protocol for determining a result of computing the function on the data point by providing a private input, wherein the result is generated based on a plurality of function evaluation keys corresponding to the plurality of servers,
wherein the private input comprises the respective function evaluation key received from each of the servers and a decryption token, the decryption token being based on an encryption algorithm of a linearly-homomorphic encryption scheme.

11. The method according to claim 10, wherein the method further comprises generating the respective request token for each of the servers according to:

$$ctx^{req} = E.Enc(pk^E_i, (r_{i-1}-r_i, (r_{i-1}-r_i, H.Enc(pk^H, r_i))))$$

wherein $ctx^{req}$ is the respective request token for an i-th server, E.Enc( ) is an encryption algorithm of an adaptive chosen ciphertext attack encryption scheme, H.Enc( ) is an encryption algorithm of a linearly-homomorphic encryption scheme, $pk^E_i$ is a public key under the adaptive chosen ciphertext attack encryption scheme for the i-th server, $pk^H$ is a public key under the linearly-homomorphic encryption scheme, $r_i(i\in[0,n-1])$ is random, $r_n=0$, and n is the number of servers.

12. The method of claim 10, wherein the function is a non-linear function.

13. A server comprising a processor coupled to a non-transitory storage medium containing instructions, which, when executed by the processor, cause the server to:
receive a request from a client to compute a function on a data point, the data point being encrypted as a ciphertext and the request including a request token generated by the client based on the ciphertext and the function, and
grant the request to compute the function on the data point by sending a function evaluation key to the client, wherein the function evaluation key is generated based on the request token and a master secret key associated with the server, wherein the master secret key is based on a share of a secret key under a linearly-homomorphic encryption scheme and another secret key under an adaptive chosen ciphertext attack encryption scheme,
wherein the function evaluation key is one of a plurality of function evaluation keys, each function evaluation key in the plurality of function evaluation keys corresponding to one of a plurality of servers participating in a distributed decryption protocol, and the plurality of function evaluation keys enable the client to generate a result of computing the function on the data point.

\* \* \* \* \*